United States Patent [19]
Carlsson

[11] Patent Number: 5,624,648
[45] Date of Patent: Apr. 29, 1997

[54] METHOD AND APPARATUS FOR CLEANING FLUE GAS

[75] Inventor: Kurt Carlsson, Växjö, Sweden

[73] Assignee: ABB Flakt AB, Stockholm, Sweden

[21] Appl. No.: 513,966

[22] PCT Filed: Mar. 4, 1994

[86] PCT No.: PCT/SE94/00183
§ 371 Date: Oct. 10, 1995
§ 102(e) Date: Oct. 10, 1995

[87] PCT Pub. No.: WO94/20199
PCT Pub. Date: Sep. 15, 1994

[30] Foreign Application Priority Data
Mar. 12, 1993 [SE] Sweden .................................. 9300818

[51] Int. Cl.$^6$ .......................... B01D 53/48; B01D 53/68
[52] U.S. Cl. .................. 423/242.1; 423/243.01; 423/244.07; 423/240 S; 422/168; 422/170; 422/172
[58] Field of Search .................... 423/240 S, 242.1, 423/243.08, 244.07, DIG. 5, 243.01, 244.01; 422/168, 170, 172

[56] References Cited

U.S. PATENT DOCUMENTS

| | | | |
|---|---|---|---|
| 2,862,789 | 12/1958 | Burgess | 423/243.06 |
| 3,995,005 | 11/1976 | Teller | 423/240 S |
| 4,795,619 | 1/1989 | Lerner | 423/244 |
| 5,100,643 | 3/1992 | Brna et al. | 423/240 R |
| 5,401,481 | 3/1995 | Rochelle et al. | 423/331 |

FOREIGN PATENT DOCUMENTS

| | | |
|---|---|---|
| 0044916 | 1/1987 | European Pat. Off. . |
| 3031845 | 4/1984 | Germany . |
| 3313522 | 10/1984 | Germany ........................... 423/240 S |
| 50-33994 | 4/1975 | Japan ............................. 423/243.08 |
| 55-111829 | 8/1980 | Japan .............................. 423/240 S |
| 61-234913 | 10/1986 | Japan ............................. 423/DIG. 5 |
| 63-84619 | 4/1988 | Japan ............................. 423/DIG. 5 |
| 3161021 | 7/1991 | Japan ............................. 423/243.08 |
| 5-154342 | 6/1993 | Japan .............................. 423/240 S |
| 5-337330 | 12/1993 | Japan .................................. 422/168 |
| 2078702 | 1/1982 | United Kingdom . |

OTHER PUBLICATIONS

"Retrofitting Waste Incineration Plant—Below Detectability Limits", *Warner Bulletin*, Feb. 1, 1993. P. 19 by Gunter Jungmann.

"Activated Wet-Dry Scrubbing of SO$_2$", Hans T. Karlsson et al., *Journal of Air Pollution Control Association*, vol. 33, No. 1, Jan. 1983, pp. 23–28.

*Primary Examiner*—Gary P. Straub
*Assistant Examiner*—Timothy C. Vanoy
*Attorney, Agent, or Firm*—Burns, Doane, Swecker & Mathis, L.L.P.

[57] ABSTRACT

A method and apparatus for cleaning a flue-gas stream containing hydrogen chloride and sulfur dioxide are disclosed. The flue gas is treated in a wet cleaner (5), thereafter injected with lime (9) and filtered through a filter (13). The method and apparatus are distinguished by the fact that a pan of the flue-gas is bypassed the wet cleaner (5) through a conduit (15), to join the remainder of the flue-gas stream before the filter (13). In this way, hydrogen chloride in the bypassed stream is reacted with injected lime to form calcium chloride, which promotes the sulfur-dioxide separation upon the injection of lime.

20 Claims, 1 Drawing Sheet

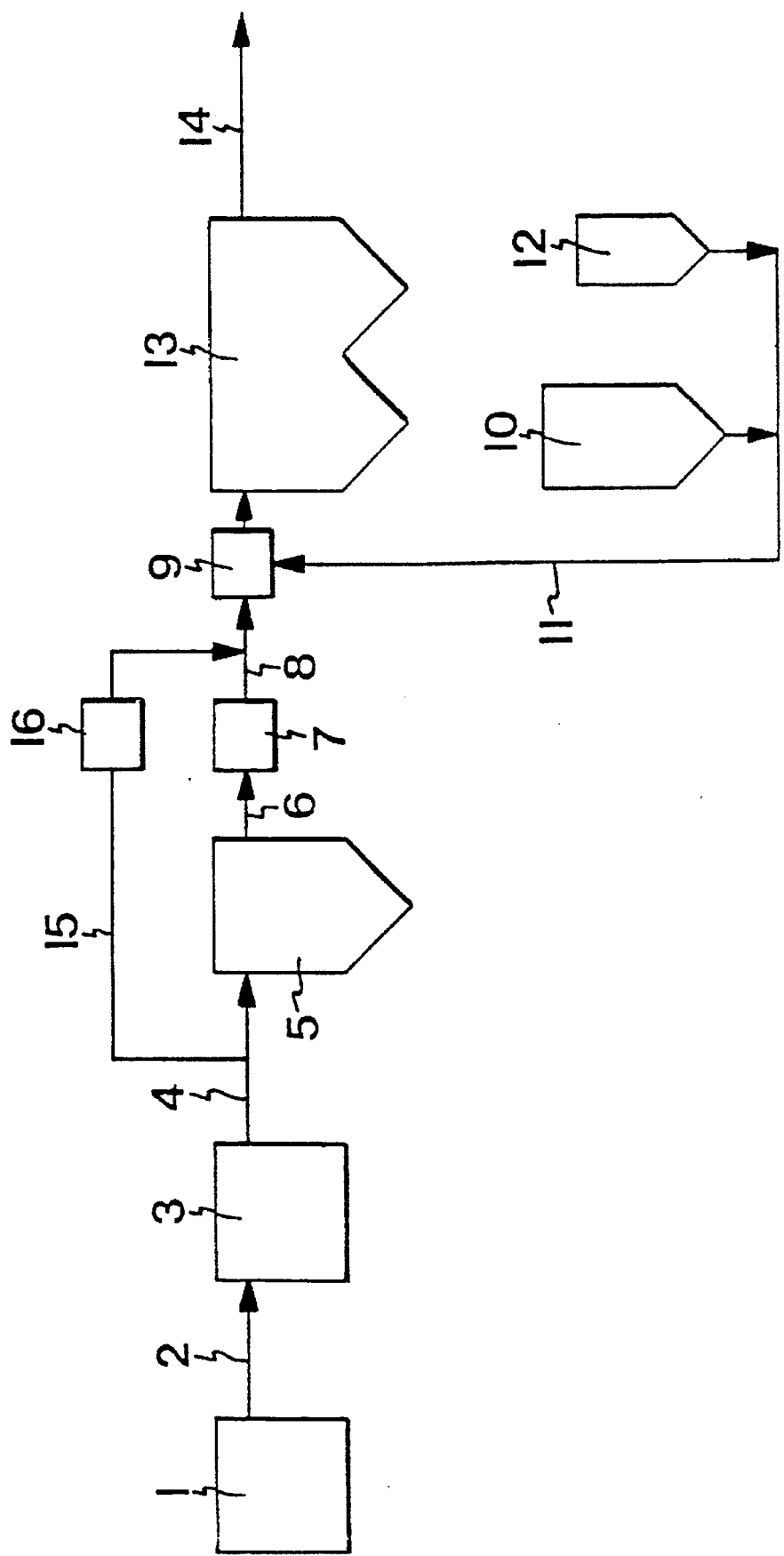

METHOD AND APPARATUS FOR CLEANING FLUE GAS

This invention relates to a method and an apparatus for cleaning a flue-gas stream containing hydrogen chloride and sulphur dioxide.

Ever higher demands have been placed on flue-gas cleaning in recent years, such that flue-gas cleaning today includes not only the separation of dust, such as fly ash, by means of e.g. an electrostatic precipitator, but also the separation of gaseous impurities, such as sulphur dioxide and hydrogen chloride, found e.g. in the flue gases generated in refuse incineration. Sulphur dioxide can be separated by wet cleaning, for instance in a scrubber where the flue-gas stream is contacted with an alkaline aqueous solution that absorbs sulphur dioxide. Also hydrogen chloride can be removed by wet cleaning in a scrubber where the flue-gas stream is contacted with an aqueous solution that absorbs hydrogen chloride. The separation of hydrogen chloride and sulphur dioxide is often performed in a combined wet cleaner, in which case hydrogen chloride is absorbed in a first stage and sulphur dioxide is absorbed in a second stage. The flue gases leaving such a combined wet cleaner are substantially rid of solid particles, hydrogen chloride and sulphur dioxide and have hitherto been regarded as sufficiently clean to be let out into the atmosphere. As environmental standards are raised, inter alia as regards the removal of nitrogen oxides (NOx), such flue gases have to be further cleaned and any remaining residues of heavy metals and sulphur dioxide should be removed to the greatest possible extent. Thus, when removing nitrogen oxides catalytically from flue-gases, it is a considerable advantage if the incoming flue gases at the most contain 5 mg of sulphur dioxide and 0.1 mg of sulphur trioxide per $Nm^3$.

In order to achieve such additional cleaning of the flue gases after the conventional wet cleaning, lime is injected into the flue gases, preferably in combination with active carbon, after the wet cleaning so as to react with any remaining impurities, whereupon the resulting product is collected on a filter. The lime injected into the flue-gas stream usually is in powder form but may also be a slurry of lime in water. Such a lime slurry is finely divided when injected into the flue-gas stream, and the water in the slurry is evaporated when contacted with the hot flue-gas stream. The resulting lime particles react with the impurities in the flue-gas stream, preferably sulphur dioxide, and are then collected on a filter. Use can be made of a bag filter in which filter bags of textile material are arranged in a filter chamber. The injected lime, preferably combined with active carbon, then deposit on the filter bags, and the cleaned flue gas leaves the bag filter. The lime-containing deposit on the filter bags may react with further impurities in the flue gases, such as sulphur dioxide, before being eventually removed from the filter bags and collected at the bottom of the filter chamber to be discharged as waste.

An instance of the above prior-art technique is described in Warner Bulletin, Feb. 1, 1993, "Retrofitting Waste Incineration Plant—Below Detectability Limits".

Furthermore, it is known, e.g. from Hans T. Karlsson, Jonas Klingspor, Marira Linné and Ingemar Bjerle, "Activated Wet-Dry Scrubbing of $SO_2$", Journal of the Air Pollution Control Association, Vol. 33, No. 1, January 1983, pp 23–28, that the separation of sulphur dioxide by means of lime in a filter, as described above, is considerably promoted by the presence of calcium chloride ($CaCl_2$). In the absence of calcium chloride, the flue gases have to be contacted with a greater amount of lime, i.e. more lime has to be injected, involving an increase in costs. Naturally, the increase in lime consumption means that the bag filter yields a greater amount of spent lime to be discharged as waste, which is a disadvantage. In order to remedy this disadvantage, it is desirable that the sulphur-dioxide separation by means of lime in the filter takes place in the presence of calcium chloride.

The object of the present invention is to remedy the disadvantage mentioned above while enabling sulphur-dioxide separation from flue gases by means of lime after wet cleaning to take place in the presence of calcium chloride. The above disadvantage is remedied and the inventive object is attained by the fact that a partial stream of the hydrogen-chloride-containing flue gases is bypassed the hydrogen-chloride-separating wet cleaning, to join the flue gases after the wet cleaning but before the filtration of lime.

Further distinctive features of the invention appear from the appended claims.

It should here be observed that UK 2,078,702 discloses flue-gas cleaning by spray-drying absorption involving lime injection as well as subsequent filtration in a filter chamber, a part of the flue gas being bypassed the spray-drying-absorption stage and conducted, together with a part of the flue gas that has been treated in the spray-drying-absorption stage, through a special section of the filter chamber. The rest of the flue gas that has been treated in the spray-drying-absorption stage is conducted through the remainder of the filter chamber, and the two flow-gas streams join with each other after the filter chamber. The object of such bypassing is to reheat the flue gases.

BRIEF DESCRIPTION OF THE DRAWING

For clarifying purposes, the invention will now be described with reference to the accompanying drawing, which schematically illustrates a preferred embodiment of an apparatus according to the invention.

FIG. 1 illustrates the method and apparatus for cleaning flue gas used in the examples.

Flue gases which, inter alia, contain hydrogen chloride and sulphur dioxide are generated in a furnace 1, e.g. for the incineration of refuse. Through a conduit 2, the flue gases are conducted to a dust separator 3, e.g. an electrostatic precipitator, for the separation of particulate material, such as fly ash. Then, the flue gases are conducted through a conduit 4 to a wet cleaner 5 for the separation of hydrogen chloride and preferably of sulphur dioxide as well. The thus-cleaned flue gases leave the wet cleaner 5 through an outlet conduit 6. When leaving, the flue gases mostly have a comparatively low temperature, such as 50°–80° C., and in order to avoid corrosion of the succeeding equipment, heating means 7, such as a heat exchanger, are preferably provided for raising the temperature of the departing flue gases to 80°–120° C. After being wet-cleaned and preferably heated as well, the flue gases are conducted through a conduit 8 on to a station 9 for lime injection. As used herein, the term "lime" is meant to encompass limestone ($CaCO_3$) as well as burnt lime (CaO) and slaked lime ($Ca(OH)_2$). Through a conduit 11, the lime is fed to the station 9 from a supply 10. Preferably, the lime is combined with active carbon from a supply 12. As mentioned earlier, the lime is injected into the flue gases in powder form or, if so desired, as an aqueous slurry. If so, the water content of the slurry in relation to the temperature of the flue gases is such that the water of the lime slurry, which is finely divided when the slurry is injected, is evaporated, leaving particles that accompany the flue-gas stream and are collected on filter bags in a bag filter 13. The lime particles and other solids are filtered off in the bag filter 13, and the flue gases then leave through a conduit 14.

In order to enhance the efficiency of the removal of sulphur dioxide when lime is injected, the reaction between sulphur dioxide and lime should, as mentioned in the foregoing, take place in the presence of calcium chloride. To this end, a part of the flue-gas stream is conducted, via a conduit 15, from the inlet conduit 4 of the wet cleaner, past the wet cleaner and to the outlet conduit 8 of the wet cleaner at a site before the filter 13 and, in the preferred embodiment illustrated in the drawing, before the station 9 for lime injection as well. Since a part of the flue-gas stream is bypassed the wet cleaner 5, this part will not be subjected to the separation of hydrogen chloride taking place in the wet cleaner. As a result, the hydrogen chloride present in the bypassed flue-gas stream may react with the injected lime to form calcium chloride, which in turn will enhance the efficiency of the sulphur-dioxide separation.

In order to attain the aimed-at effect, it is sufficient to bypass only a minor amount of the flue-gas stream, preferably about 1–8% by volume thereof, and most preferred about 2–5% by volume. In order to obtain a suitable ratio of bypassed flue gas to flue gas conducted through the wet cleaner 5, a regulating means 16 is preferably arranged in the bypass conduit 15. The regulating means 16 regulates the flow in the bypass conduit 15 according to the flue-gas flow in the inlet conduit 4 and/or the hydrogen-chloride content of the gas in the inlet conduit 4.

In the embodiment described above and illustrated in the drawing, the bypassed flue-gas stream 15 joins the flue-gas stream that has passed through the wet cleaner 5 before the station 9 for lime injection. However, the bypassed flue-gas stream 15 may alternatively join the flue-gas stream that has passed through the wet cleaner 5 after the station 9 for lime injection, provided that it does so before the filter 13.

The invention will now illustrated with the aid of a few illustrative Examples. The apparatus employed in the Examples is of the type described above.

EXAMPLE 1

The incineration of household refuse generated flue gases which contained 900±300 mg of HCl and 250±150 mg of $SO_2$ per $Nm^3$. Then, 95% by volume of the flue gases was conducted through a wet scrubber which separated HCl but basically no $SO_2$. After the wet scrubber, the flue gases contained less than 5 mg of HCl and less than 250 mg of $SO_2$ per $Nm^3$. The remaining 5% by volume of the total flue-gas stream was bypassed the wet scrubber and joined the flue gases leaving the wet scrubber before the station for lime injection. The flue gases conducted to the station for lime injection contained about 50 mg of HCl and about 250 mg of $SO_2$ per $Nm^3$. The lime was injected in an amount five times the stoichiometrically required amount. After the injection of lime, the flue gases were conducted to a bag filter, after which the flue gases contained less than 2.5 mg of HCl and less than 25 mg of $SO_2$ per $Nm^3$. This implies a 95% efficiency in the separation of HCl and a 90% efficiency in the separation of $SO_2$. The chlorine content of the dust collected by the bag filter was estimated at about 2–3%.

EXAMPLE 2

The same flue gases as in Example 1 were conducted through a wet scrubber which removed not only HCl but also $SO_2$. After the wet scrubber, the flue gases contained less than 5 mg of HCl and less than 50 mg of $SO_2$ per $Nm^3$. About 2% by volume of the total flue-gas stream was bypassed the wet scrubber and joined the flue gases from the wet scrubber before the station for lime injection. The flue gases conducted to the station for lime injection then contained about 20 mg of HCl and about 50 mg of $SO_2$ per $Nm^3$. The lime was injected in an amount ten times the stoichiometrically required amount. After the injection of lime, the flue gases were conducted to a bag filter for filtering off the injected lime and any other solid impurities present. The flue gas leaving the bag filter was analysed for HCl and $SO_2$ and was found to contain less than 1 mg of HCl and less than 5 mg of $SO_2$ per $Nm^3$, which implies an efficiency of more than 95% in the separation of HCl and an efficiency of more than 90% in the separation of $SO_2$. The chlorine content of the dust collected by the bag filter was about 2%.

I claim:

1. In a method for cleaning a flue-gas stream which contains hydrogen chloride and sulphur dioxide and is treated in a wet cleaner (5), thereafter injected with lime (9) and filtered through a filter (13), wherein the improvement comprises bypassing a portion of the flue gas around the wet cleaner (5) so as to be forwarded to the lime injection station (9) so that the hydrogen chloride within the flue gas reacts with the injected source of lime to result in the formation of calcium dichloride.

2. A method as set forth in claim 1, wherein about 1–8% by volume of the flue-gas stream is bypassed the wet cleaner (5).

3. A method as set forth in claim 2, wherein about 2–5% by volume of the flue-gas stream is bypassed the wet cleaner (5).

4. A method as set forth in claim 1, wherein the flue-gas stream leaving the wet cleaner (5) is heated to a temperature of about 80°–120° C. before joining the bypassed flue-gas stream.

5. A method as set forth in claim 1, wherein the source of lime is injected into the flue-gas stream in powder form.

6. A method as set forth in claim 1, wherein the injected lime is slaked source of lime ($Ca(OH)_2$), burnt lime (CaO) or calcium carbonate ($CaCO_3$).

7. In an apparatus for cleaning a flue-gas stream which contains hydrogen chloride and sulphur dioxide, the apparatus comprising an inlet conduit (4) for supplying a flue-gas stream to a wet cleaner (5), an outlet conduit (6) for discharging a flue-gas stream from the wet cleaner (5), a station (9) for injecting lime into the flue-gas stream after the wet cleaner (5), and a filter (13) for filtering off lime, wherein the improvement comprises a bypass conduit (15) which extends from the inlet conduit (4) of the wet cleaner (5) to the outlet conduit (8) of the wet cleaner (5) before the filter (13) and through which a part of the flue-gas stream is bypassed the wet cleaner (5).

8. An apparatus as set forth in claim 7, wherein the bypass conduit (15) has means (16) for regulating the gas flow.

9. An apparatus as set forth in claim 7 wherein the means (16) in the bypass conduit for regulating the flue-gas flow are adapted to do so according to the flue-gas flow in the inlet conduit (4) and/or the hydrogen-chloride content of the gas in the inlet conduit (4).

10. An apparatus as set forth in claim 7, wherein the outlet conduit (6) of the wet cleaner (5) is provided with heating means (7).

11. A method as set forth in claim 2, wherein the flue-gas stream leaving the wet cleaner (5) is heated to a temperature of about 80°–120° C. before joining the bypassed flue-gas stream.

12. A method as set forth in claim 3, wherein the flue-gas stream leaving the wet cleaner (5) is heated to a temperature of about 80°–120° C. before joining the bypassed flue-gas stream.

13. A method as set forth in claim 2, wherein the source of lime is injected into the flue-gas stream in powder form.

14. A method as set forth in claim 3, wherein the source of lime is injected into the flue-gas stream in powder form.

15. A method as set forth in claim 4, wherein the source of lime is injected into the flue-gas stream in powder form.

16. A method as set forth in claim 2, wherein the injected source of lime is slaked lime ($Ca(OH)_2$), burnt source of lime (CaO) or calcium carbonate ($CaCO_3$).

17. A method as set forth in claim 3, wherein the injected source of lime is slaked lime ($Ca(OH)_2$), burnt lime (CaO) or calcium carbonate ($CaCO_3$).

18. An apparatus as set forth in claim 8, wherein the means (16) in the bypass conduit for regulating the flue-gas flow are adapted to do so according to the flue-gas flow in the inlet conduit (4) and/or the hydrogen-chloride content of the gas in the inlet conduit (4).

19. An apparatus according to claim 8, wherein the outlet conduit (6) of the wet cleaner (5) is provided with heating means (7).

20. An apparatus according to claim 8, wherein the outlet conduit (6) of the wet cleaner (5) is provided with heating means (7).

* * * * *